United States Patent
Hayashi et al.

(10) Patent No.: US 9,718,436 B2
(45) Date of Patent: Aug. 1, 2017

(54) BUCKLE DEVICE

(71) Applicant: KABUSHIKI KAISHA TOKAI-RIKA-DENKI-SEISAKUSHO, Aichi-ken (JP)

(72) Inventors: Koji Hayashi, Aichi-ken (JP); Takuhiro Saito, Aichi-ken (JP); Makoto Matsuzaki, Aichi-ken (JP); Tatsuhiro Murasaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/097,762

(22) Filed: Apr. 13, 2016

(65) Prior Publication Data

US 2016/0304049 A1    Oct. 20, 2016

(30) Foreign Application Priority Data

Apr. 17, 2015  (JP) .................................. 2015-085067

(51) Int. Cl.
| | | |
|---|---|---|
| *B60R 22/20* | (2006.01) | |
| *B60R 22/03* | (2006.01) | |
| *A44B 11/25* | (2006.01) | |
| *B60R 22/18* | (2006.01) | |

(52) U.S. Cl.
CPC .............. *B60R 22/20* (2013.01); *B60R 22/03* (2013.01); *A44B 11/2503* (2013.01); *B60R 2022/1806* (2013.01)

(58) Field of Classification Search
CPC .. B60R 22/20; B60R 22/03; B60R 2022/1806
See application file for complete search history.

(56) References Cited

U.S. PATENT DOCUMENTS

| | | | | |
|---|---|---|---|---|
| 4,650,215 A | * | 3/1987 | Sasaki ..................... | B60R 22/03 280/809 |
| 2008/0001388 A1 | * | 1/2008 | Messner ................. | B60R 22/12 280/801.1 |
| 2009/0302593 A1 | * | 12/2009 | Grau ....................... | B60R 22/03 280/801.1 |

(Continued)

FOREIGN PATENT DOCUMENTS

| | | |
|---|---|---|
| DE | 102012016213 A1 | 2/2014 |
| DE | 102013009488 A1 | 12/2014 |

(Continued)

OTHER PUBLICATIONS

Japanese Office Action for corresponding Japanese Patent Application No. 2015-085067 dated Nov. 1, 2016 and English translation thereof.

(Continued)

*Primary Examiner* — Drew J Brown
(74) *Attorney, Agent, or Firm* — Roberts Mlotkowski Safran Cole & Calderon P.C.

(57) ABSTRACT

In a buckle device, wire ropes and a coiled cord run through the inside of a tubular buckle guide. Here, a partition wall is provided inside the buckle guide, and the inside of the buckle guide is partitioned by the partition wall into a wire rope side and a coiled cord side. Due to this, the coiled cord can be prevented from contacting the wire ropes inside the buckle guide.

6 Claims, 3 Drawing Sheets

(56) References Cited

U.S. PATENT DOCUMENTS

| | | | | |
|---|---|---|---|---|
| 2010/0176581 A1* | 7/2010 | Usoro | ................... | B60R 22/03 |
| | | | | 280/807 |
| 2012/0299282 A1* | 11/2012 | Holbein | ................. | B60R 22/03 |
| | | | | 280/806 |
| 2014/0265503 A1* | 9/2014 | Thomas | ................... | B60N 2/16 |
| | | | | 297/344.13 |
| 2014/0375042 A1 | 12/2014 | Holbein et al. | | |
| 2016/0304050 A1* | 10/2016 | Murasaki | ........... | A44B 11/2561 |
| 2017/0021796 A1* | 1/2017 | Hayashi | ................. | B60R 22/20 |

FOREIGN PATENT DOCUMENTS

| | | |
|---|---|---|
| JP | S60191563 U | 12/1985 |
| JP | H04-353054 A | 12/1992 |
| JP | H07122135 A | 5/1995 |
| JP | H07-251706 A | 10/1995 |
| JP | 2005026555 A | 1/2005 |
| JP | EP 1743813 A1 * 1/2007 ............ B60R 22/18 |
| JP | 2007022227 A | 2/2007 |
| JP | 2014172487 A | 9/2014 |

OTHER PUBLICATIONS

Extended European Search Report for corresponding European Patent Application No. 16165230.0 dated Aug. 31, 2016.
Office Action issued in the corresponding Japanese Patent Application No. 2015-085067 on Mar. 7, 2017.

* cited by examiner

BUCKLE DEVICE

CROSS-REFERENCE TO RELATED APPLICATION

This application claims priority under 35 USC 119 from Japanese Patent Application No. 2015-085067 filed Apr. 17, 2015, the disclosure of which is incorporated by reference herein.

BACKGROUND

Field of the Invention

The present invention relates to a buckle device in which a buckle is moved.

Related Art

There is a buckle device where a cord member is connected to a buckle, a moving member is coupled to the buckle, the buckle and the cord member are moved together with the moving member due to the moving member being moved (e.g., see the specification of German Patent Publication No. 102013009488). In this type of buckle device, there is the potential for the cord member to contact the moving member.

SUMMARY

In consideration of the circumstances described above, the present invention obtains a buckle device that can prevent or restrain a cord member from contacting a moving member.

A buckle device pertaining to a first aspect includes: a buckle with which a tongue of a seat belt device is to be engaged; a moving member that is coupled to the buckle and movable together with the buckle; a drive component that moves the moving member by outputting drive force; a cord member that is connected to the buckle; and a restricting member that restricts relative approaching of the cord member to the moving member.

In the buckle device pertaining to the first aspect, the relative approaching of the cord member with respect to the moving member is restricted by the restricting member, so the cord member can be prevented or restrained from contacting the moving member.

A buckle device pertaining to a second aspect is the buckle device pertaining to the first aspect, further including a tube member inside of which the moving member and the cord member are provided, wherein the restricting member is a partition wall that is provided inside the tube member and partitions a space inside the tube member into a moving member side and a cord member side.

In the buckle device pertaining to the second aspect, the moving member and the cord member are provided inside the tube member. The partition wall serving as the restricting member is provided inside the tube member. The space inside the tube member is partitioned by the partition wall into the moving member side and the cord member side, and the relative approaching of the cord member toward the moving member can be restricted by the partition wall.

A buckle device pertaining to a third aspect of the present invention is the buckle device pertaining to the second aspect, further including an open portion that is formed in a side portion of the tube member, and through which the moving member or the cord member is passable from an outside of the tube member to the inside of the tube member.

In the buckle device pertaining to the third aspect, the open portion is formed in the side portion of the tube member, and the moving member or the cord member is passable through the open portion from the outside, for example, the lateral side of the tube member to the inside of the tube member. Due to this, the moving member or the cord member can be disposed inside the tube member from the outside of the tube member.

In the first aspect, it is possible that the buckle device further includes a tube member inside of which the moving member and the cord member are provided, wherein, in a cross-sectional view orthogonal to a longitudinal direction of the tube member, the restricting member is provided inside the tube member and is arranged between the moving member and the cord member.

As described above, in the buckle device pertaining to the present invention, the cord member can be prevented or restrained from contacting the moving member.

BRIEF DESCRIPTION OF THE DRAWINGS

An exemplary embodiment will be described in detail with reference to the following figures, wherein.

DETAILED DESCRIPTION

Figure 1:
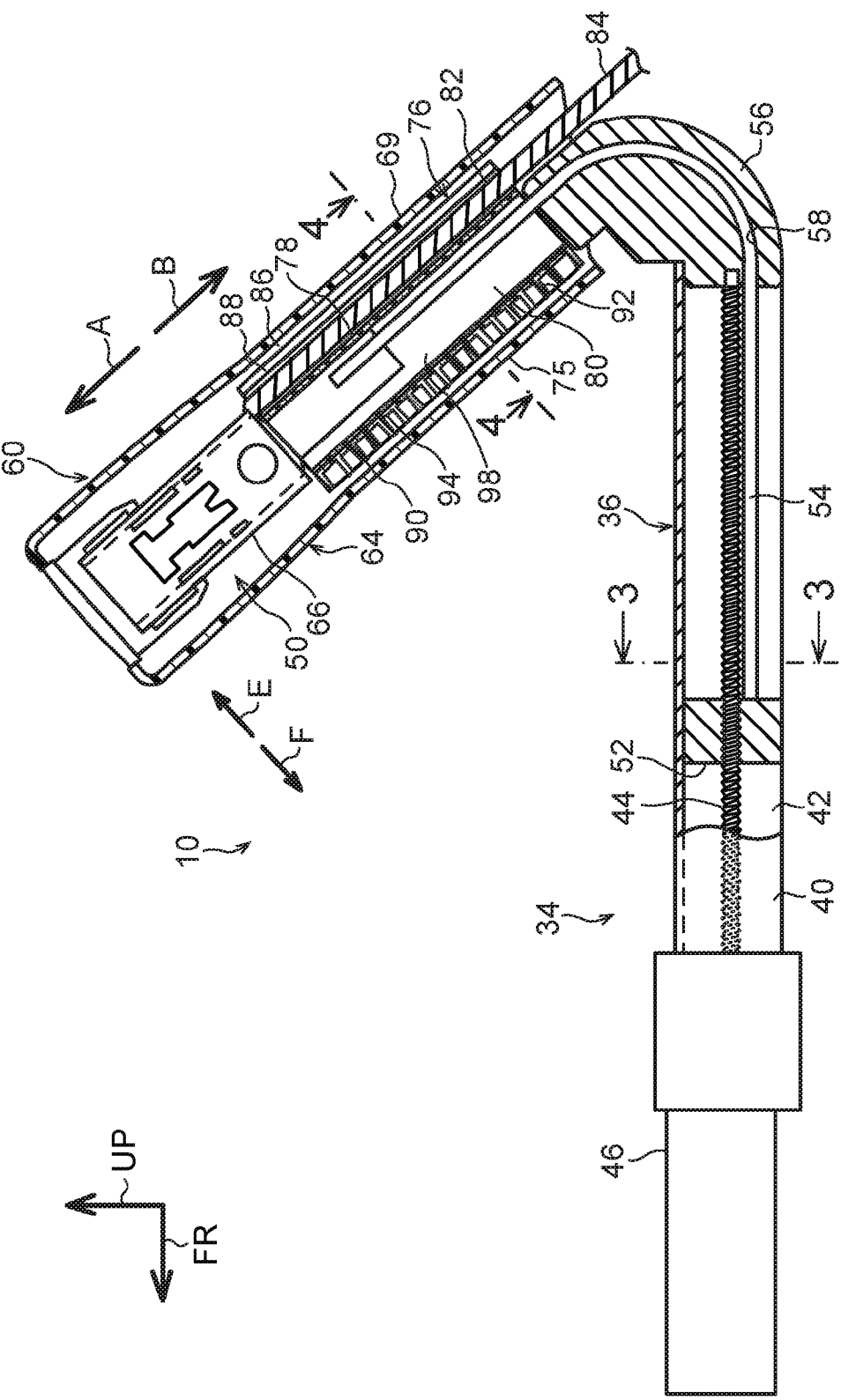
FIG. 1 is a side view, seen from inside in a vehicle width direction, of a buckle device pertaining to the embodiment.

Next, an exemplary embodiment will be described on the basis of FIG. 1 to FIG. 4. It should be noted that, in the drawings, arrow FR indicates a vehicle forward direction of a vehicle to which a buckle device 10 has been applied, arrow OUT indicates an outward direction in the vehicle width direction, and arrow UP indicates a vehicle upward direction.

Configuration of the Exemplary Embodiment

Figure 2:
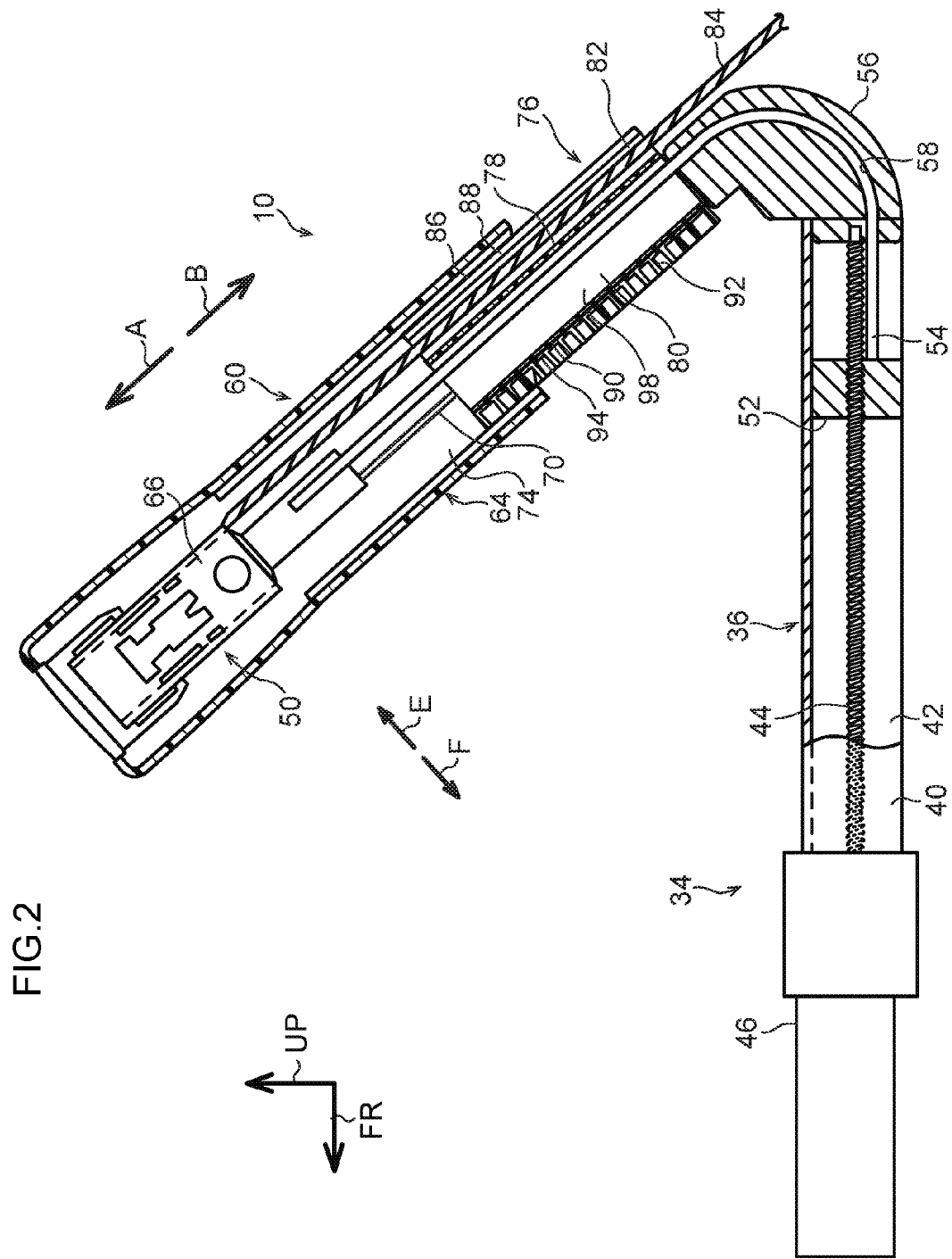
FIG. 2 is a side view, corresponding to FIG. 1, showing a state in which a buckle cover has been moved relative to a buckle guide.

As shown in FIG. 1, the buckle device 10 pertaining to the present embodiment is provided with a buckle drive device 34. The buckle drive device 34 is provided with a frame 36 serving as a slider guide mechanism. The frame 36 is fixed to the vehicle body, such as a floor portion 38 of the vehicle or a skeletal member of the seat 30, by fastening members such as bolts. As shown in FIG. 2, the frame 36 is provided with a pair of guide walls 40 and 42 that serve as slider guide portion and that oppose each other in the vehicle width direction, and a drive screw 44 serving as a drive section is provided between the guide walls 40 and 42. The direction of the central axis of the drive screw 44 lies along the vehicle forward and rearward direction, and the drive screw 44 is configured to freely rotate about its central axis.

A motor actuator 46 serving as a drive force output section is provided on the vehicle front side of the frame 36. The vehicle front side end portion of the drive screw 44 is coupled to the motor actuator 46, and the drive screw 44 is rotated about its central axis by drive force that is output from a motor of the motor actuator 46. The motor actuator 46 is electrically connected to a control unit (not shown in the drawings) such as a motor driver and an ECU. The control unit is electrically connected to a detection component, such as a door opening and closing detection component such as a courtesy switch that detects the opening and closing of the door of the vehicle corresponding to the seat to which the buckle device 10 is applied and/or an occupant detection component such as a load sensor provided in a seat cushion of the seat. Moreover, the control unit is electrically connected to a buckle switch (not shown in the drawings) that is provided in a later-described buckle 50 and detects that the tongue 26 is engaged with the buckle 50. The motor actuator 46 is controlled on the basis of electrical signals that are output from the buckle switch and the detection component such as the door opening and closing detection component and the occupant detection component, and the like.

Figure 3:
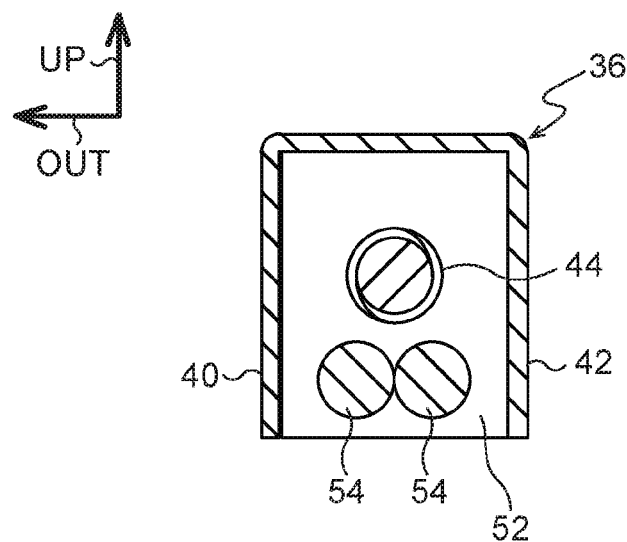
FIG. 3 is a cross-sectional view along line 3-3 of FIG. 1.

A slider 52 is provided between the guide wall 40 and the guide wall 42 of the frame 36. The slider 52 is formed in the shape of a block. As shown in FIG. 3, the vehicle width direction side surfaces of the slider 52 are in abutting with the guide walls 40 and 42 of the frame 36. Furthermore, a screw hole through which the drive screw 44 penetrates is formed in the slider 52. By the drive screw 44 rotating, the slider 52 is guided by the guide walls 40 and 42 and slid in the vehicle forward and rearward direction.

Furthermore, as shown in FIG. 1, the buckle device 10 is provided with a pair of wire ropes 54 serving as moving member. The wire ropes 54 are formed in long shapes and, as shown in FIG. 3, are arranged adjacent to each other in the vehicle width direction. As shown in FIG. 1, in sections of the wire ropes 54, on the base end sides than their longitudinal direction middle portions, the longitudinal direction of the wire ropes 54 lies along the vehicle forward and rearward direction, and the longitudinal direction base end portions of the wire ropes 54 are coupled to the slider 52 on the vehicle lower side of the drive screw 44. Due to this, when the slider 52 is slid in the vehicle forward and rearward direction, the wire ropes 54 are moved in their longitudinal direction.

Moreover, a wire guide 56 is provided on the vehicle rear side of the frame 36. A wire guide groove 58 is formed in the wire guide 56. The wire guide groove 58 opens at the vehicle width direction outside surface of the wire guide 56 and is closed off by a cover member (not shown in the drawings) provided on the vehicle width direction outside of the wire guide 56. Furthermore, one longitudinal direction end of the wire guide groove 58 opens at the vehicle front side surface of the wire guide 56. Moreover, the wire guide groove 58 is curved in its longitudinal direction middle portion in a direction about an axis whose axial direction is along the vehicle width direction, and the longitudinal direction other end of the wire guide groove 58 opens at the vehicle upper side surface of the wire guide 56. The wire ropes 54 are passed through the wire guide groove 58, and sections of the wire ropes 54 on the distal end sides than their longitudinal direction middle portions extend obliquely upward in the vehicle forward direction (the direction of arrow A in FIG. 1) from the longitudinal direction other end of the wire guide groove 58.

Figure 4:
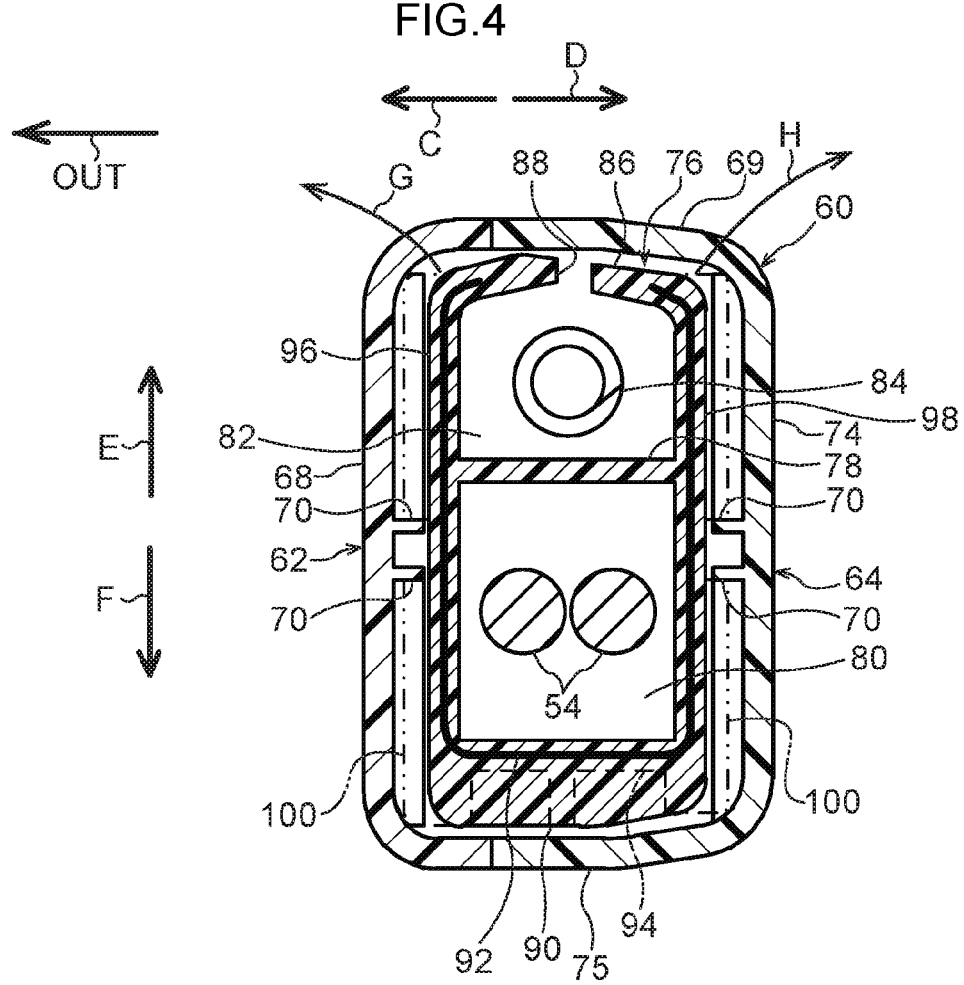
FIG. 4 is a cross-sectional view along line 4-4 of FIG. 1.

The buckle device 10 is provided with a buckle cover 60. As shown in FIG. 4, the buckle cover 60 is provided with a first cover member 62 and a second cover member 64. The first cover member 62 and the second cover member 64 are made of a synthetic resin material. The buckle cover 60 is formed as a result of the first cover member 62 and the second cover member 64 being assembled together in the vehicle width direction and integrated. In a state in which the first cover member 62 and the second cover member 64 have been assembled together, the buckle cover 60 has a tubular shape whose longitudinal direction lies along a direction tilting in the vehicle forward and rearward direction relative to the vehicle up and down direction (the direction of arrow A and the direction of arrow B in FIG. 1).

The buckle 50 is provided in the vehicle upper side section inside the buckle cover 60. The buckle 50 is provided with a buckle body 66. The buckle body 66 is formed in a cross-sectionally U-shape whose vertical walls extend inward in the vehicle width direction from both width direction end portions of a bottom plate whose longitudinal direction is substantially the same direction as the longitudinal direction of the buckle cover 60. Constituent parts (not shown in the drawings) of the buckle 50, such as a latch, are provided inside the buckle body 66. When the tongue provided on the webbing of the seat belt device is inserted between both vertical walls of the buckle body 66 obliquely from the vehicle upper side and vehicle front side of the buckle body 66, the latch enters a hole portion formed in the tongue. Due to this, the tongue becomes engaged with the buckle 50.

Furthermore, as shown in FIG. 4, the cross-sectional shape of the longitudinal direction middle portion of the buckle cover 60 as cut in a direction orthogonal to the longitudinal direction of the buckle cover 60 is substantially rectangular. The buckle cover 60 is provided with cover long-side wall portions 68 and 74 which are pair, and cover short-side wall portions 69 and 75 which are pair, whose dimension is shorter than that of the cover long-side wall portions 68 and 74. The thickness direction of the buckle cover 60 (the direction of arrow C and the direction of arrow D in FIG. 4) lies along the vehicle width direction, and a pair of guide ribs 70 serving as guide member are formed on the cover long-side wall portion 68 which is at one thickness direction side (the side in the direction of arrow C in FIG. 4) of the buckle cover 60.

The pair of guide ribs 70 are formed so as to be narrow width plates that are long in the longitudinal direction of the buckle cover 60 (the direction of arrow A and the direction of arrow B in FIG. 1 and FIG. 2) and whose thickness direction lies along the width direction of the buckle cover 60 (the direction of arrow E and the direction of arrow F in FIG. 1, FIG. 2, and FIG. 4). The pair of guide ribs 70 oppose (face) each other in the width direction of the buckle cover 60. Furthermore, the pair of guide ribs 70 are formed on the cover long-side wall portion 68 in the substantially central portion thereof in the width direction of the buckle cover 60. The pair of guide ribs 70 are formed projecting inward in the thickness direction of the buckle cover 60 from the cover long-side wall portion 68.

Furthermore, as shown in FIG. 4, on the cover long-side wall portion 74 on the other thickness direction side (the side in the direction of arrow D in FIG. 4) of the buckle cover 60, like on the cover long-side wall portion 68 on the one thickness direction side of the buckle cover 60, a pair of guide ribs 70 serving as guide member are formed projecting inward in the thickness direction of the buckle cover 60.

Furthermore, as shown in FIG. 1, the buckle device 10 is provided with a buckle guide 76 serving as a tube member. The buckle guide 76 is made of a synthetic resin material that is more flexible than that of the first cover member 62 and the second cover member 64 configuring the buckle cover 60. The buckle guide 76 is formed in a tubular shape that is long in the longitudinal direction of the buckle cover 60 (the direction of arrow A and the direction of arrow B in FIG. 1).

The vehicle lower side end portion of the buckle guide 76 is fixed to the wire guide 56 directly or indirectly via another member. Due to this, the buckle guide 76 is fixed to the vehicle body via the wire guide 56 and the frame 36.

Furthermore, as shown in FIG. 4, the cross-sectional shape of the buckle guide 76 as cut in a direction orthogonal to the longitudinal direction of the buckle guide 76 is substantially rectangular. The buckle guide 76 is provided with a pair of guide long-side wall portions 96 and 98 and a pair of guide short-side wall portions 86 and 94 whose dimension is shorter than that of the guide long-side wall portions 96 and 98. The thickness direction of the buckle guide 76 (the direction of arrow C and the direction of arrow D in FIG. 4) lies along the vehicle width direction.

Furthermore, a pair of guide-side engagement portions 100 are formed on the guide long-side wall portion 96 which is on the one thickness direction side (the side in the direction of arrow C in FIG. 4) of the buckle guide 76. The pair of guide-side engagement portions 100 are formed on both sides of the guide long-side wall portion 96 that sandwich the width direction central portion of the buckle guide 76. The pair of guide ribs 70 of the cover long-side wall portion 68 of the buckle cover 60 are between the pair of guide-side engagement portions 100.

Furthermore, a pair of guide-side engagement portions 100 are formed on the guide long-side wall portion 98 on the other thickness direction side (the side in the direction of arrow D in FIG. 4) of the buckle guide 76 like on the guide long-side wall portion 96 on the one thickness direction side of the buckle guide 76. The pair of guide ribs 70 of the cover long-side wall portion 74 of the buckle cover 60 are between the pair of guide-side engagement portions 100 of the guide long-side wall portion 98.

The buckle cover 60 can move along its longitudinal direction due to the guide ribs 70 of the buckle cover 60 being guided by the pairs of guide-side engagement portions 100 of the buckle guide 76.

Moreover, a partition wall 78 serving as a restricting member is formed inside the buckle guide 76. The partition wall 78 is formed at the substantially width direction middle portion of the buckle guide 76 and is formed continuously along substantially the entire length of the buckle guide 76 in the longitudinal direction of the buckle guide 76. Furthermore, the end portion of the partition wall 78 on the one thickness direction side (the side in the direction of arrow C in FIG. 4) of the buckle guide 76 is connected to the guide long-side wall portion 96 of the buckle guide 76, and the end portion of the partition wall 78 on the other thickness direction side (the side in the direction of arrow D in FIG. 4) of the buckle guide 76 is connected to the guide long-side wall portion 98 of the buckle guide 76.

The partition wall 78 partitions the space inside the buckle guide 76 into a cord housing portion 82 on one width direction side of the buckle guide 76 (the side in the direction of arrow E in FIG. 4) and a wire housing portion 80 on the other width direction side of the buckle guide 76 (the side in the direction of arrow F in FIG. 4). The wire ropes 54 run through the inside the wire housing portion 80 of the buckle guide 76. The longitudinal direction distal end sides of the wire ropes 54 extend outside the buckle guide 76 from the vehicle front-upper-oblique side end portion of the buckle guide 76 and are coupled to the buckle body 66 provided in the buckle cover 60.

A curl cord (coiled cord) 84 serving as a cord member runs through the cord housing portion 82 of the buckle guide 76. The curl cord 84 is formed in a long shape and includes at least one of a power line and a signal line covered by a synthetic resin material. Furthermore, the curl cord 84 is curl and can extend and contract in its longitudinal direction.

The longitudinal direction distal end side of the curl cord 84 extends outside the buckle guide 76 from the vehicle upper side end portion of the buckle guide 76, is fixed to the buckle body 66 of the buckle 50 provided in the buckle cover 60, and is electrically connected to a buckle switch (not shown in the drawings) of the buckle 50. Furthermore, the longitudinal direction base end side of the curl cord 84 extends outside the buckle guide 76 from the vehicle lower side end portion of the buckle guide 76. The longitudinal direction base end side of the curl cord 84 is directly or indirectly connected to a battery (not shown in the drawings) installed in the vehicle if the curl cord 84 is provided with a power line, and the longitudinal direction base end side of the curl cord 84 is directly or indirectly connected to the control unit installed in the vehicle if the curl cord 84 is provided with a signal line.

Moreover, a slit 88 serving as an open portion is formed in the guide short-side wall portion 86 of the buckle guide 76 on the one width direction side (the side in the direction of arrow E in FIG. 4) of the buckle guide 76. The slit 88 is formed along the entire length of the buckle guide 76 in the longitudinal direction of the buckle guide 76. For this reason, on the one thickness direction side (the side in the direction of arrow C in FIG. 4) of the buckle guide 76 relative to the slit 88, the guide short-side wall portion 86 and the guide long-side wall portion 96 of the buckle guide 76 can be elastically deformed toward the one thickness direction side (in the direction of arrow G in FIG. 4) of the buckle guide 76. Further, on the other thickness direction side (the side in the direction of arrow D in FIG. 4) of the buckle guide 76 relative to the slit 88, the guide short-side wall portion 86 and the guide long-side wall portion 98 of the buckle guide 76 can be elastically deformed toward the other thickness direction side (in the direction of arrow H in FIG. 4) of the buckle guide 76. Due to this, the open width of the slit 88 can be widened.

Furthermore, a reinforcement rib 90 is formed in the buckle guide 76. The reinforcement rib 90 is formed on the outside of the guide short-side wall portion 94 on the other width direction side of the buckle guide 76 (the side in the direction of arrow F in FIG. 4). Due to this, the rigidity of the buckle guide 76 is reinforced.

Moreover, a reinforcement plate 92 serving as a reinforcement member is provided in the buckle guide 76. The reinforcement plate 92 is made of a metal plate that is more rigid than the synthetic resin material forming the buckle guide 76. Furthermore, the reinforcement plate 92 is cross-sectionally substantially C-shaped and is embedded inside the guide short-side wall portion 94 on the other width direction side of the buckle guide 76 and inside the guide long-side wall portions 96 and 98 on both thickness direction sides of the buckle guide 76. Due to this, the rigidity of the buckle guide 76 is reinforced.

Operation and Effects of the Embodiment

In the buckle device 10, when, for example, the door of the vehicle, corresponding to the seat to which the buckle device 10 is applied, changes from a closed state to an open state, this change in the opened/closed state of the door is detected by the detection component such as the door opening and closing detection component such as a courtesy switch. Furthermore, when, for example, an occupant sits in the seat, the fact that the occupant is sitting in the seat is detected by the detection component such as the occupant detection component such as a load sensor provided in the seat cushion of the seat. The level of the electrical signal that is output from the detection component(s) to the control unit is switched (changes) due to the change in the state of the door and/or the seat as the occupant gets into the vehicle. Due to this, when the motor actuator 46 is driven and the drive screw 44 is rotated, the slider 52 is guided by the guide walls 40 and 42 of the frame 36 and slid in the vehicle rearward direction. Due to this, when the wire ropes 54 are moved in the direction of the longitudinal direction distal end side, the buckle body 66 is pushed obliquely upward in the vehicle forward direction by the wire ropes 54.

When the pushing force from the wire ropes 54 is transmitted via the buckle body 66 to the buckle cover 60, the guide ribs 70 of the cover long-side wall portions 68 and 74 of the buckle cover 60 are guided by the guide-side engagement portions 100 of the buckle guide 76, and as shown in FIG. 2, the buckle cover 60 is moved obliquely upward in the vehicle forward direction. In this way, due to the buckle cover 60 being moved, the occupant can easily engage the tongue provided on the webbing of the seat belt device into the buckle 50 and can easily put on the webbing 18.

The longitudinal direction distal end side of the coiled cord 84 is fixed to the buckle body 66 of the buckle 50 which is provided in the vehicle upper side portion inside the buckle cover 60. Due to this, when the buckle cover 60 is moved obliquely upward in the vehicle forward direction or obliquely downward in the vehicle rearward direction relative to the buckle guide 76, the longitudinal direction distal end side of the coiled cord 84 is also moved obliquely upward in the vehicle forward direction or obliquely downward in the vehicle rearward direction.

Here, the partition wall 78 is formed inside the buckle guide 76 at the width direction middle portion of the buckle guide 76, and the space inside the buckle guide 76 is partitioned by the partition wall 78 into the cord housing portion 82 through which the coiled cord 84 runs and the wire housing portion 80 through which the wire ropes 54 run. Due to this, even when the coiled cord 84 is moved inside the buckle guide 76 toward the wire ropes 54 side by the coiled cord 84 moving together with the buckle cover 60, the coiled cord 84 is brought into abutting with the partition wall 78 so that the movement of the coiled cord 84 toward the wire ropes 54 side is restricted.

Furthermore, the longitudinal direction of the coiled cord 84 lies along a direction (the direction of arrow A and the direction of arrow B in FIG. 1) sloping in the vehicle forward and rearward direction relative to the vehicle up and down direction inside the buckle guide 76. Due to this, the coiled cord 84 may bend (warp) toward the vehicle lower side inside the buckle guide 76, and due to this also, the coiled cord 84 is moved so as to approach the wire ropes 54 inside the buckle guide 76. In this way, even when the coiled cord 84 bends inside the buckle guide 76, the coiled cord 84 is brought into abutting contact with the partition wall 78 so that the movement of the coiled cord 84 toward the wire ropes 54 is restricted.

Due to this, the coiled cord 84 can be prevented from contacting the wire ropes 54 inside the buckle guide 76, wear of the coiled cord 84 caused by the coiled cord 84 contacting the wire ropes 54 can be prevented, and the durability of the coiled cord 84 can be improved. Furthermore, because the coiled cord 84 can be prevented from contacting the wire ropes 54 inside the buckle guide 76, the coiled cord 84 can be prevented or restrained from contacting the wire ropes 54 and having grease or the like applied to the wire ropes 54 stick to the coiled cord 84.

In the present embodiment, on the one thickness direction side (the side in the direction of arrow C in FIG. 4) of the buckle guide 76 further than the slit 88, the guide short-side wall portion 86 and the guide long-side wall portion 96 of the buckle guide 76 can be elastically deformed toward the one thickness direction side (in the direction of arrow G in FIG. 4) of the buckle guide 76, and on the other thickness direction side (the side in the direction of arrow D in FIG. 4) of the buckle guide 76 further than the slit 88, the guide short-side wall portion 86 and the guide long-side wall portion 98 of the buckle guide 76 can be elastically deformed toward the other thickness direction side (in the direction of arrow H in FIG. 4) of the buckle guide 76.

Due to this, the open width of the slit 88 can be widened. When the open width of the slit 88 is widened in this way, the coiled cord 84 can be disposed inside the cord housing portion 82 of the buckle guide 76 from the one width direction side (the side in the direction of arrow E in FIG. 4) of the buckle guide 76. Due to this, for example, in a state in which the longitudinal direction distal end portion of the coiled cord 84 is fixed to the buckle body 66 of the buckle 50, it becomes possible to dispose the coiled cord 84 inside the cord housing portion 82 of the buckle guide 76, and the assembly of the coiled cord 84 can be improved.

In the present embodiment, the partition wall 78 inside the buckle guide 76 is formed continuously along the entire length region of the buckle guide 76 in the longitudinal direction of the buckle guide 76. However, the partition wall 78 may be formed only in the neighborhood of one of end portions in the longitudinal direction of the buckle guide 76, or may be formed only in the longitudinal direction middle portion of the buckle guide 76. Furthermore, partition wall(s) 78 may be intermittently formed in the longitudinal direction of the buckle guide 76.

Moreover, the buckle device 10 has a configuration where both end portions of the partition wall 78 inside the buckle guide 76 in the thickness direction of the buckle guide 76 are connected to the guide long-side wall portions 96 and 98 of the buckle guide 76. However, the buckle device 10 may also have a configuration where one of the end portions of the partition wall 78 in the thickness direction of the buckle guide 76 is only connected to one of the guide long-side wall portions 96 and 98 and the other of the end portions is not connected to the other of the guide long-side wall portions 96 and 98.

Furthermore, in the present embodiment, the buckle device 10 has a configuration where the partition wall 78 serves as the restricting member. However, the buckle device 10 may also be given a configuration where, for example, a rib is formed projecting from at least one of the guide long-side wall portions 96 and 98 inside the buckle guide 76 and where the coiled cord 84 is brought into abutting contact with this rib so that the movement of the coiled cord 84 toward the wire ropes 54 side is restricted.

Namely, it is possible in the buckle device 10 that, when viewing along the longitudinal direction of the buckle guide 76 (in a cross-sectional view orthogonal to a longitudinal direction of the buckle guide 76), the restricting member is arranged between the coiled cord 84 and the wire ropes 54, the coiled cord 84 is brought into abutting contact with the restricting member so that the movement of the coiled cord 84 toward the wire ropes 54 side is restricted.

Moreover, the buckle device 10 may also be given a configuration where the buckle guide 76 itself serves as the restricting member, only one of the coiled cord 84 and the wire ropes 54 is provided inside the buckle guide 76, and the other of the coiled cord 84 and the wire ropes 54 is provided outside the buckle guide 76. In this way, the restricting member can be widely applied, without being limited to a configuration like the partition wall 78 or the rib, as long as it has a configuration where the relative movement of the coiled cord 84 serving as a cord member toward the wire ropes 54 serving as a moving member is restricted.

Moreover, in the present embodiment, the buckle device 10 has a configuration where the slit 88 is formed in the guide short-side wall portion 86 on the one width direction side of the buckle guide 76, but the buckle device 10 may also have a configuration where the slit 88 is formed in the guide short-side wall portion 94 on the other width direction side of the buckle guide 76, the guide-short side wall portion 94 and the guide long-side wall portions 96 and 98 are elastically deformed to widen the open width of the slit 88, and the wire ropes 54 are disposed inside the wire housing portion 80 of the buckle guide 76 from the other width direction side of the buckle guide 76.

Furthermore, in the present embodiment, the pair of wire ropes 54 serve as the moving member. However, the wire rope 54 may one wire rope, or the wire ropes 54 may three or more wire ropes. Moreover, the moving member may also be another member other than the wire ropes 54.

Moreover, in the present embodiment, the coiled cord 84 serves as the cord member, but the cord member does not have to be formed in a coil like the coiled cord 84.

Furthermore, in the present embodiment, the cross-sectional shape of the buckle guide 76 serving as the tube member, through which the wire ropes 54 serving as the moving member and the coiled cord 84 serving as the cord member pass is rectangular. However, the cross-sectional shape of the tube member may also be square or a polygonal shape other than rectangular. Furthermore, the cross-sectional shape of the tube member may also be circular or elliptical, which is to say that the cross-sectional shape of the tube member is not particularly limited.

Moreover, in the present embodiment, the control of the motor actuator 46 for causing the buckle cover 60 to move obliquely upward in the vehicle forward direction is performed on the basis of switch (change) in the level of the electrical signal that is output from the detection component(s) such as the door opening and closing detection component such as a courtesy switch and/or the occupant detection component that detects that the occupant is sitting in the seat.

However, it is not limited to a configuration based on switch (change) in the level of the electrical signal that is output from the door opening and closing detection component and/or the occupant detection component. For example, the control of the motor actuator 46 may also be performed on the basis of an unlock operation that unlocks a door lock when the occupant gets into the vehicle. Moreover, an operation switch of the motor actuator 46 for unlocking the door lock may be provided in the vehicle cabin or a remote control key for the vehicle, so that the control of the motor actuator 46 for causing the buckle cover 60 to move obliquely upward in the vehicle forward direction is performed by such operation switch being operated by the occupant.

That is, it suffices for the control of the motor actuator 46 for causing the buckle cover 60 to move obliquely upward in the vehicle forward direction to be based on an operation to parts of the vehicle when the occupant gets into the vehicle.

What is claimed is:

1. A buckle device comprising:
   a buckle with which a tongue of a seat belt device is to be engaged;
   a moving member that is coupled to the buckle and movable together with the buckle;
   a drive component that moves the moving member by outputting drive force;
   a cord member that is connected to the buckle; and
   a restricting member including a partition wall immovably affixed to a vehicle body indirectly that restricts relative approaching of the cord member to the moving member.

2. The buckle device of claim 1, further comprising
   a tube member inside of which the moving member and the cord member are provided,
   wherein the partition wall is provided inside the tube member and partitions a space inside the tube member into a moving member side and a cord member side.

3. The buckle device of claim 2, further comprising
   an open portion that is formed in a side portion of the tube member, and through which the moving member or the cord member is passable from an outside of the tube member to the inside of the tube member.

4. The buckle device of claim 1, further comprising
   a tube member inside of which the moving member and the cord member are provided,
   wherein, in a cross-sectional view orthogonal to a longitudinal direction of the tube member, the restricting member is provided inside the tube member and is arranged between the moving member and the cord member.

5. The buckle device of claim 4, further comprising
   an open portion that is formed in a side portion of the tube member, and through which the moving member or the cord member is passable from an outside of the tube member to the inside of the tube member.

6. A buckle device comprising:
   a buckle with which a tongue of a seat belt device is to be engaged;
   a moving member that is coupled to the buckle and movable together with the buckle;
   a guide member for guiding the moving member;
   a drive component that moves the moving member by outputting drive force;
   a cord member that is connected to the buckle; and
   a restricting member including a partition wall immovably affixed to a vehicle body via the guide member that restricts relative approaching of the cord member to the moving member.

\* \* \* \* \*